(12) United States Patent
Ballinger

(10) Patent No.: US 7,854,651 B2
(45) Date of Patent: Dec. 21, 2010

(54) HIGHLY BACTERIOCIDAL CHLORINE DIOXIDE, FORMULATION, PREPARATION AND USE THEREOF

(76) Inventor: Kenneth E. Ballinger, 448 Larkspur Dr., Kennett Square, PA (US) 19348-1790

( * ) Notice: Subject to any disclaimer, the term of this patent is extended or adjusted under 35 U.S.C. 154(b) by 0 days.

(21) Appl. No.: 12/216,370

(22) Filed: Jul. 2, 2008

(65) Prior Publication Data

US 2010/0003910 A1    Jan. 7, 2010

(51) Int. Cl.
*A22C 25/00* (2006.01)
(52) U.S. Cl. ...................................... 452/173
(58) Field of Classification Search ................. 452/173
See application file for complete search history.

(56) References Cited

U.S. PATENT DOCUMENTS

| | | | |
|---|---|---|---|
| 4,362,753 A * | 12/1982 | Barta | 426/332 |
| 5,866,005 A * | 2/1999 | DeSimone et al. | 210/634 |
| 6,582,734 B1 * | 6/2003 | Wei et al. | 424/665 |
| 7,381,439 B2 * | 6/2008 | Hilgren et al. | 426/321 |
| 7,415,428 B2 * | 8/2008 | Garwood | 705/26 |
| 7,470,172 B2 * | 12/2008 | Carracciolo, Jr. | 452/81 |
| 7,504,124 B2 * | 3/2009 | Man et al. | 426/332 |
| 7,507,429 B2 * | 3/2009 | Man et al. | 426/332 |

* cited by examiner

*Primary Examiner*—Thomas Price
(74) *Attorney, Agent, or Firm*—Glenna Hendricks; John Tarcza

(57) ABSTRACT

When used as a biocide on newly butchered chickens, chlorine dioxide at concentrations of 12 to 50 ppm is effective at temperatures of 35° C. to 90° C. with 15 ppm being very effective at temperatures of 45° C. to 60° C. Chlorine dioxide in about 50° C. water did not off gas chlorine dioxide at a concentration of 50 ppm.

18 Claims, No Drawings

HIGHLY BACTERIOCIDAL CHLORINE DIOXIDE, FORMULATION, PREPARATION AND USE THEREOF

FIELD AND BACKGROUND OF THE INVENTION

The instant invention relates to use of Chlorine Dioxide in an improved composition to lower bacteria count on a variety of products, including carcasses.

Chlorine dioxide is widely used in industrial applications as a disinfectant, bleaching agent and oxidizer. Pulp and paper manufacturers use it to bleach paper, pharmaceutical manufacturers use it to sanitize production equipment, water treatment facilities use it in drinking water to purify water. Food processing companies have begun to use chlorine dioxide to sanitize equipment and to rinse food to lower bacterial contamination. Aqueous solutions of chlorine dioxide levels in common use for food processing are generally higher than 150 ppm for extended contact times. The cost and off gassing of such high levels of chlorine dioxide in aqueous solutions raise employee risks and costs of operation. Lower chlorine dioxide concentrations with more efficient ways to extend contact time between chlorine dioxide and the surface of the processed food would improve the reduction of bacteria, mold and virus in packaged and prepared food.

Foam enhancement of the sanitizing properties of chlorine dioxide was disclosed in U.S. Pat. No. 4,889,654. The patent provides compositions containing chlorine dioxide in foam for use on solid surfaces. Foam has not been adopted for use on food by the food processing industry even though the use of foam was disclosed by U.S. Pat. No. 4,889,654 in 1988. Foam disinfectants have been used on solid surfaces and equipment during this period of time. Use of foam enhanced chlorine dioxide for poultry, beef and pork processing has not previously been known. There are many reasons for this. Any material used in processing food must be safe when consumed. Materials used in foams should not be allergenic to those who would not normally be allergic to the food being treated.

SUMMARY OF THE INVENTION

The instant invention involves use of high temperature generation of chlorine dioxide, which can be done in a safe and effective manner. Surprisingly, chlorine dioxide in about 50° C. water did not off gas chlorine dioxide at a concentration of 50 ppm. For use in the methods of the invention, a concentration of 12 to 50 ppm is deemed effective, with 15 ppm being very effective. A concentration of 12 ppm to 25 ppm would be a more preferred range. The solution is effective at temperatures of 35° C. to 90° C., but the preferred temperature is 45° C. to 60° C. At these concentrations and temperatures control of bacterial growth was dramatically improved. Further improvement occurs with the use of foam either applied in the water containing the chlorine dioxide or when applied immediately before the flushing with the solution containing chlorine dioxide at 15 to 50 ppm concentration can be used. While dipping is an appropriate means of treating the carcasses, it is also appropriate to use the chlorine dioxide at 15 to 50 ppm at temperature of

DETAILED DESCRIPTION OF THE INVENTION

It was found that one way to reduce the concentration of the chlorine dioxide while increasing effectiveness is to increase the temperature of the water used to generate the chlorine dioxide. The reason this has not been done in the past is fear of off gassing as solubility is lost in hot water. Chlorine dioxide gas in the air can be a safety hazard. Hence, the surprising finding that off gassing was controlled when chlorine dioxide was present in a water wash at 50 ppm and at a temperature of about 50° C. provided incentive to use chlorine dioxide in the process. Further benefit can be obtained by using a foaming agent in the wash solution or in conjunction with the wash. The chlorine dioxide wash can be applied by dipping the entire carcass into the solution or may be applied in a spray, such as in spray cabinets usually used on lines in poultry processing plants.

One way to extend the contact time between chlorine dioxide and the food surface is to use a food grade foam. Two properties of foam are important for this application. The first is to maintain the micro bubbles of chlorine dioxide gas in solution in contact with the food surface. A chlorine dioxide-containing foam would improve the contact on the surface of the food by using the surface tension properties of foam to permit a steady supply of chlorine dioxide gas to move very close to the surfaces where bacteria, mold and virus are found. Foam surfactants can also aid the penetration of chlorine dioxide through protective layers of fats and proteins on poultry, beef and pork in processing plants.

EXAMPLE 1

An aqueous chlorine dioxide stock solution of 2000 ppm was prepared by combining 5% sodium chlorite and 10% hydrochloric acid. From the stock solution, two concentrations of chlorine dioxide were prepared by dilution with water, 50 ppm and 15 ppm. Freshly killed chicken carcasses were submerged in containers of chlorine dioxide for various times.

TABLE 1

Poultry Carcass treatment with $ClO_2$

| Treatment | Contact Time | ClO2 PPM | Temperature ° C. |
|---|---|---|---|
| A | 15 sec | 15 | 32 |
| B | 15 sec | 15 | 30 |
| C | 15/60/15 sec[1] | 15 | 29 |
| D | 15 sec | 50 | 29 |
| E | 15 sec | 50 | 29 |
| F | 15/60/15 sec[1] | 50 | 29 |
| G | 15 sec | 15 | 52 |
| H | 15 sec | 15 | 51 |
| I | 15/60/15 sec[1] | 15 | 50 |
| J | 15 sec | 50 | 50 |
| K | 15 sec | 50 | 50 |
| L | 15/60/15 sec[1] | 50 | 51 |
| M | 15/60/15 sec[1] | 0 | 51 |

[1] 15 sec contact time, 60 second dripping time and 15 sec contact time

After treatment, carcasses were dripped for 10 seconds, immediately placed in a sterile bag with 400 ml of buffered peptone and rinsed for one minute. Each test level used four carcasses as replicates for statistical purposes. Carcass rinses were analyzed for total plate counts (TPC) at 37° C., psychotropes (10° C.), *Escherichia coli*. Coliforms and yeasts and molds (Y&M).

Results

TABLE 2

Summary of the log CFU/ml by treatment and by type of bacterial count

| Treatment | TPC | Psychotrophes | E. Coli | Coliforms | Y&M |
|---|---|---|---|---|---|
| A | 7.2 a | 5.8 a | 6.0 a | 6.0 a | 0.3 c |
| B | 7.0 a, b | 5.0 a, b | 2.6 c, d, e | 3.4 b, c, d | 0.0 c |
| C | 6.9 a, b | 5.1 a, b | 5.0 a, b | 5.1 a, b | 0.0 c |

TABLE 2-continued

Summary of the log CFU/ml by treatment and by type of bacterial count

| Treatment | TPC | Psychotrophes | E. Coli | Coliforms | Y&M |
|---|---|---|---|---|---|
| D | 6.9 a, b | 4.8 a, b, c | 5.2 a, b | 5.2 a, b | 1.5 c |
| E | 6.5 a, b, c | 4.3 b, c, d | 4.6 a, b, c | 4.5 a, b, c | 6.0 a |
| F | 6.9 a, b | 5.5 a | 5.6 a | 5.7 a | 4.4 b |
| G | 5.3 e, d | 1.4 f | 0.0 f | 0.7 e, f | 3.2 b |
| H | 4.9 e | 0.9 f | 2.2 d, e | 2.0 d, e | 3.1 b |
| I | 5.6 e, c, d | 3.2 d, e | 2.4 d, e | 1.9 d, e, f | 0.0 c |
| J | 6.2 b, c, d | 2.8 e | 1.2 e, f | 1.4 d, e, f | 0.5 c |
| K | 5.1 e | 3.8 c, d, e | 0.0 f | 0.0 f | 0.0 c |
| L | 4.9 e | 2.7 e | 3.5 b, c, d | 2.6 c, d, e | 0.0 c |
| M | 5.6 c, d, e | 4.3 b, c, d | 3.0 c, d, e | 3.1 c, d | 0.0 c |

Means with different letters in the same column are statistically different (P<0.05) The raw results are summarized in Table 3.

TABLE 3

(a). Log CFU/ml for the different bacterial groups based on temperature

| Bacterial Group | Treatments | Mean | Standard Error | Replicates |
|---|---|---|---|---|
| Total Plate Count | 30° C. | 6.0 a | 0.09 | 24 |
|  | 50° C. | 5.3 b | 0.14 | 24 |
| Psychrotrophes | 30° C. | 5.1 a | 0.14 | 24 |
|  | 50° C. | 2.5 b | 0.25 | 24 |
| E. Coli | 30° C. | 4.8 a | 0.35 | 24 |
|  | 50° C. | 1.5 b | 0.32 | 24 |
| Coliforms | 30° C. | 4.9 a | 0.29 | 24 |
|  | 50° C. | 1.4 c | 0.30 | 24 |
| Yeasts & Molds | 30° C. | 2.0 a | 0.55 | 24 |
|  | 50° C. | 1.1 a | 0.31 | 24 |

Means with different letters are statistically different (P<0.05)

The comparison of the values based on temperature (30° C. versus 50° C.) for the different bacterial groups in Table 2 shows an important statistical reduction of bacteria concentrations at 50° C. A reduction of 1.6 log CFU/ml for TPC, 2.6 log CFU/ml for psychotrophes, 3.3 log CFU/ml for E. coli, 3.5 log CFU/ml for coliforms and 0.9 log CFU/ml for yeasts and molds demonstrates the surprising effects of elevated temperatures on the activity level of ClO2.

Grouping the data by concentrations shows no change in effect based on concentration of ClO2 at 50 ppm and 15 ppm.

The surprising effect of temperature is an important aspect of the instant invention. While the solutions containing chlorine dioxide were, in the particular examples, at about 50° C., a temperature, though range of 35° C. to 90° C. would be appropriate (a more preferred range being 45° C. to 60° C.) to provide activation of the chlorine precursor and provide beneficial biocidal activity.

The use of a foaming agent and surfactant of food quality can beneficially increase contact time to further reduce bacteria counts on the surface of food such as poultry during processing. Foaming agents that would be acceptable include, but are not limited to egg white (especially when used on chicken carcasses), cocamidopropyl betaine, potassium salt tetrahydro iso humalone, detergent hydrotropes, food grade surfactants, propyl glycol alginate, fatty acid salts, yucca shidegra, sodium pyrophosphate, calcium stroyl lactate, polysorbates, potassium phosphate, polyethylene glycol esters of fatty acids, acacia, fatty acid esters, acetylated distarch phosphate, acetylated monglycerides, agar, quillaira extracts, magnesium stearate, methyl cellulose, hydroxyl propyl methyl cellulose, oxidized starch polyglycerol ester of rianoleic acid, guar gum, etc. Whipping agents include, but are not limited to, sodium alginate, sodium caseinate, sodium aluminum phosphate, sodium metaphosphate, sodium phosphate (mono, id and tri basic), fatty acid salts, sodium polyphosphates, sodium pyrophosphate, and sodium steroyl lactylate. The use in the process of the invention requires that the whip or foam hold the chlorine dioxide against the surface washed sufficiently longer to increase contact time with the surface. Care must also be taken to assure that the materials are hypoallergic.

EXAMPLE 2

In testing a material that would be appropriate for use on chickens, a whip containing varying amounts of egg white in room temperature (RT) water was whipped. Even when diluted with water at a 4:1 water:egg solution, the egg white whipped well and in a fine spray clung to human skin until washed off with cold water. Since the egg albumin is a natural product of chickens, its use would not constitute addition of an unnatural product in this food supply In this particular case, any chicken product, such as a product made from the bones of the chicken, would be appropriate for use to add to the chlorine dioxide wash to increase the time of exposure to the wash.

I claim:

1. A method of lowering bacterial count on a poultry carcass comprising the exposing the carcass to a solution containing at least 12 ppm chlorine dioxide at a temperature of 35° C. to 90° C. for a time sufficient to decrease bacterial count on said carcass.

2. The method of claim 1 wherein the solution is at a temperature between 45° C. and 60° C.

3. The method of claim 1 wherein the carcass is exposed to the solution by dipping.

4. The method of claim 1 wherein the carcass is exposed to the solution in a spray cabinet.

5. The method of claim 1 wherein the concentration of chlorine dioxide in the solution is 12 ppm to 25 ppm.

6. The method of claim 1 wherein the solution contains 12 ppm to 25 ppm chlorine dioxide and is at a temperature between 45° C. to and 60° C.

7. The method of claim 1 wherein the carcass is freshly killed.

8. The method of claim 1 wherein the solution is an aqueous solution.

9. The method of claim 1 wherein the solution further comprises a foaming or whipping agent.

10. A method of lowering yeast or mold or psychotrope counts on a carcass comprising the exposing the carcass to a solution containing at least 12 ppm chlorine dioxide at a temperature of 35° C. to 90° C. for a time sufficient to decrease bacterial count on said carcass.

11. The method of claim 10 wherein the solution is at a temperature between 45° C. and 60° C.

12. The method of claim 10 wherein the carcass is exposed to the solution by dipping.

13. The method of claim 10 wherein the carcass is exposed to the solution in a spray cabinet.

14. The method of claim 10 wherein the concentration of chlorine dioxide in the solution is 12 ppm to 25 ppm.

15. The method of claim 10 wherein the solution contains 12 ppm to 25 ppm chlorine dioxide and is at a temperature between 45° C. and 60° C.

16. The method of claim 10 wherein the carcass is freshly killed.

17. The method of claim 10 wherein the solution is an aqueous solution.

18. The method of claim 10 wherein the solution further comprises a foaming or whipping agent.

* * * * *